(12) United States Patent
Krittian

(10) Patent No.: US 9,562,606 B2
(45) Date of Patent: Feb. 7, 2017

(54) HYDROSTATIC POSITIVE DISPLACEMENT MACHINE

(71) Applicant: Linde Hydraulics GmbH & Co. KG, Aschaffenburg (DE)

(72) Inventor: Lukas Krittian, Aschaffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 470 days.

(21) Appl. No.: 13/952,770

(22) Filed: Jul. 29, 2013

(65) Prior Publication Data

US 2014/0157765 A1   Jun. 12, 2014

(30) Foreign Application Priority Data

Jul. 30, 2012  (DE) .................. 10 2012 106 906

(51) Int. Cl.
| | |
|---|---|
| *F16H 61/42* | (2010.01) |
| *F04B 1/20* | (2006.01) |
| *F04B 1/30* | (2006.01) |
| *F04B 1/32* | (2006.01) |

(52) U.S. Cl.
CPC ............ *F16H 61/42* (2013.01); *F04B 1/2078* (2013.01); *F04B 1/30* (2013.01); *F04B 1/324* (2013.01)

(58) Field of Classification Search
CPC ............ F04B 1/18; F04B 1/2078; F16H 61/42
USPC .......... 92/12.2, 13, 499, 504, 49; 417/222.1, 417/269, 270; 60/433
See application file for complete search history.

(56) References Cited

U.S. PATENT DOCUMENTS

| | | | | | |
|---|---|---|---|---|---|
| 2,243,603 | A | * | 5/1941 | MacMillin | ................ F15B 9/10 60/403 |
| 3,074,345 | A | * | 1/1963 | Scheflow | .................. F04B 1/18 417/270 |
| 3,106,224 | A | * | 10/1963 | Moss | .................. F15B 13/0402 137/625.63 |
| 4,051,765 | A | * | 10/1977 | Saito | ......................... F15B 9/14 417/270 |
| 4,779,648 | A | * | 10/1988 | Sloate | ................. F15B 13/0402 137/625.6 |
| 4,918,918 | A | * | 4/1990 | Miki | ....................... F04B 1/324 60/487 |
| 6,155,798 | A | | 12/2000 | Deininger et al. | |
| 6,390,228 | B2 | * | 5/2002 | Serizawa | ................. 137/625.23 |
| 7,322,375 | B2 | * | 1/2008 | Goldfarb | ............... F16K 11/085 137/625.22 |
| 7,735,517 | B2 | * | 6/2010 | Kerckhove | ......... F15B 13/0402 137/625.6 |

(Continued)

FOREIGN PATENT DOCUMENTS

| | | |
|---|---|---|
| DE | 19608228 A1 | 9/1997 |
| DE | 19753866 A1 | 8/1998 |

*Primary Examiner* — John K Fristoe, Jr.
*Assistant Examiner* — Richard Drake
(74) *Attorney, Agent, or Firm* — The Webb Law Firm

(57) ABSTRACT

A hydrostatic positive displacement machine (1) with a variable displacement volume includes a cradle (3) pivoted by a hydraulic positioning device (7) having a positioning piston device (8). A position-controlled control valve (10) generates a control pressure and includes axially displaceable and locked setting valve means (20) and the rotatable feedback valve means (21). Control cross sections are exposed by an axial displacement of the setting valve means (20) relative to the feedback valve means (21) and are closed by rotational movement of the feedback valve means (21) relative to the setting valve means (20).

26 Claims, 5 Drawing Sheets

(56) References Cited

U.S. PATENT DOCUMENTS

| | | | |
|---|---|---|---|
| 9,150,091 B2* | 10/2015 | Endo | B60K 6/12 |
| 2005/0238501 A1* | 10/2005 | Brailovskiy | F04B 1/146 |
| | | | 417/222.1 |
| 2009/0272256 A1* | 11/2009 | Knussman | F01B 3/102 |
| | | | 91/368 |
| 2013/0284134 A1* | 10/2013 | Methley | F01L 1/344 |
| | | | 123/90.17 |

* cited by examiner

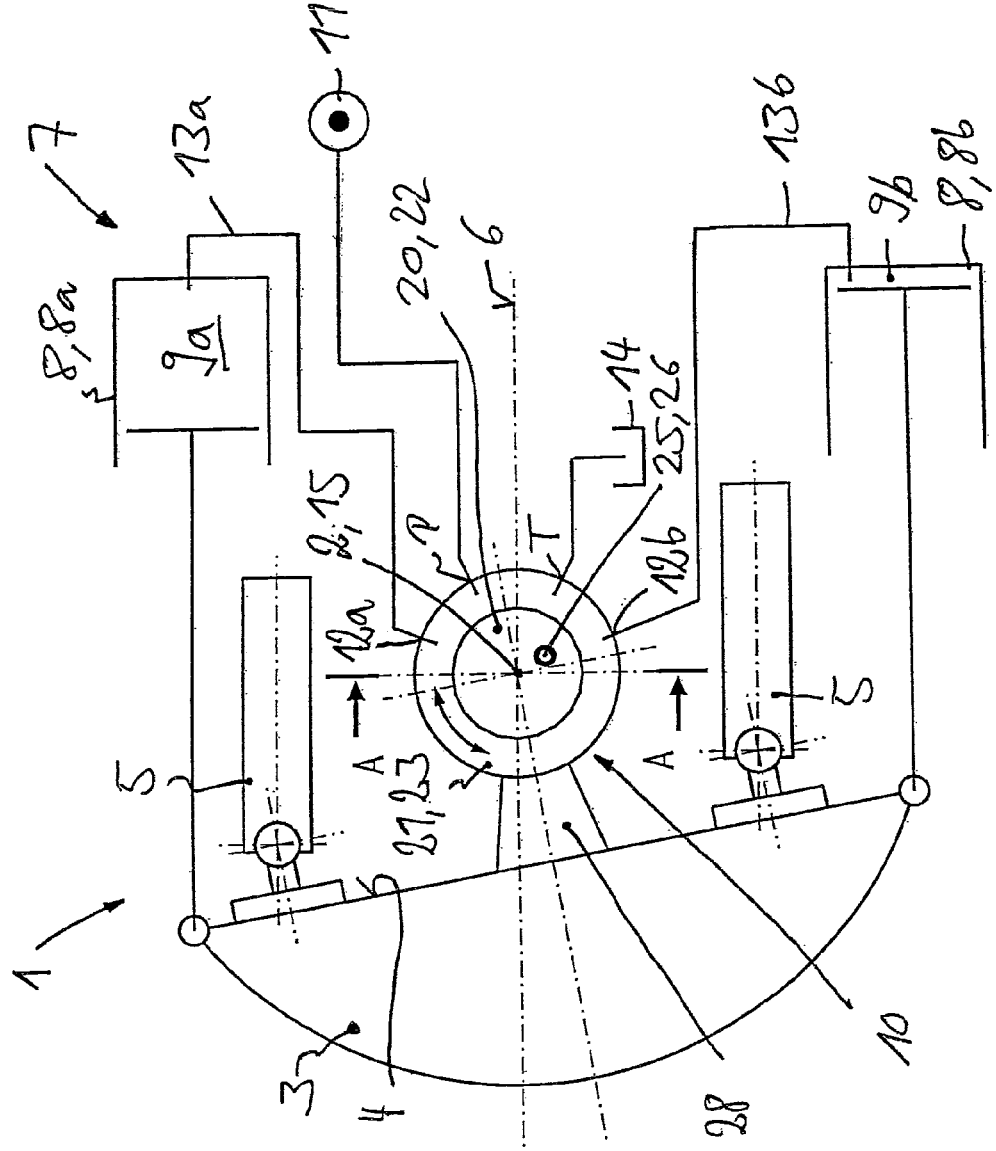

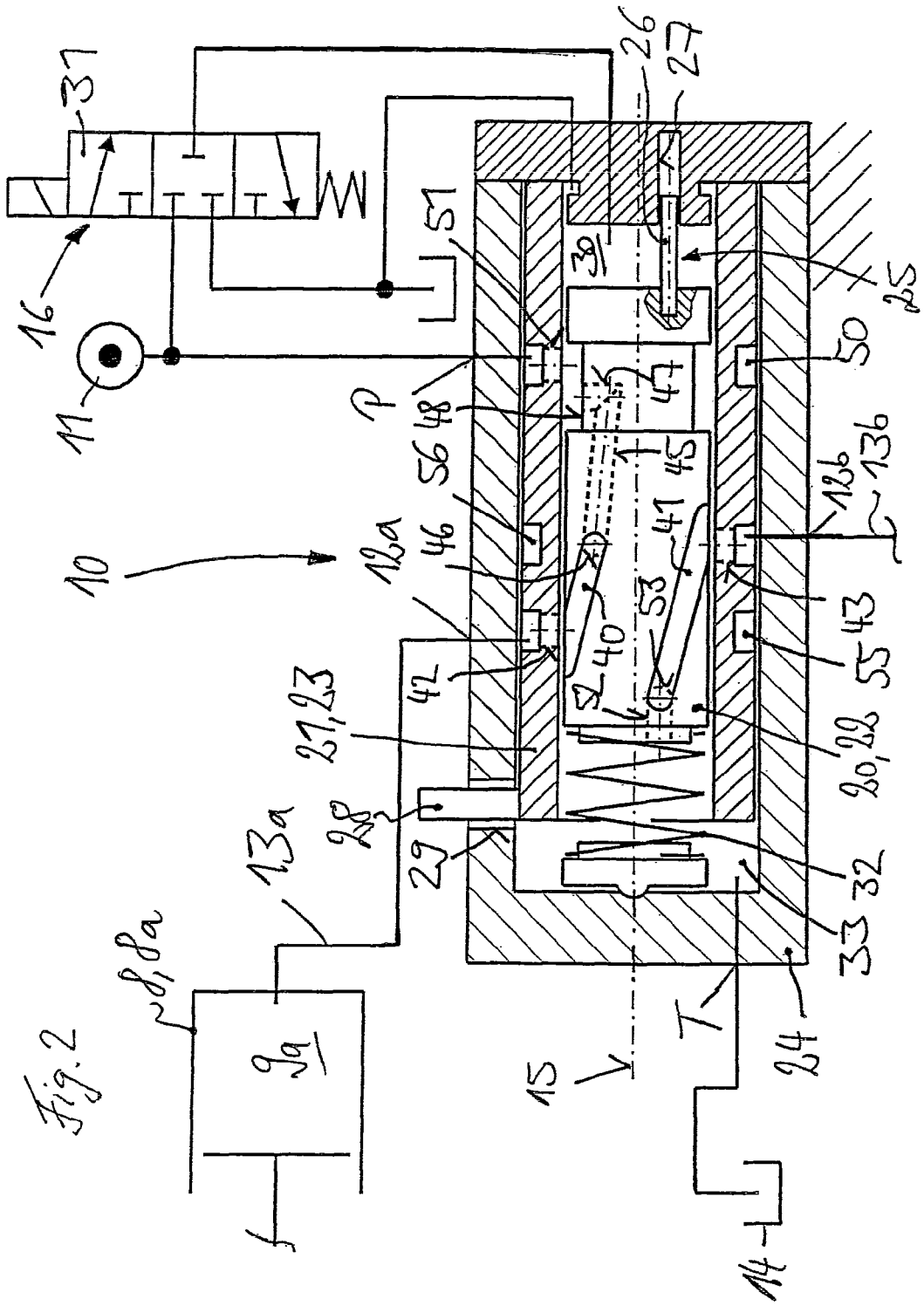

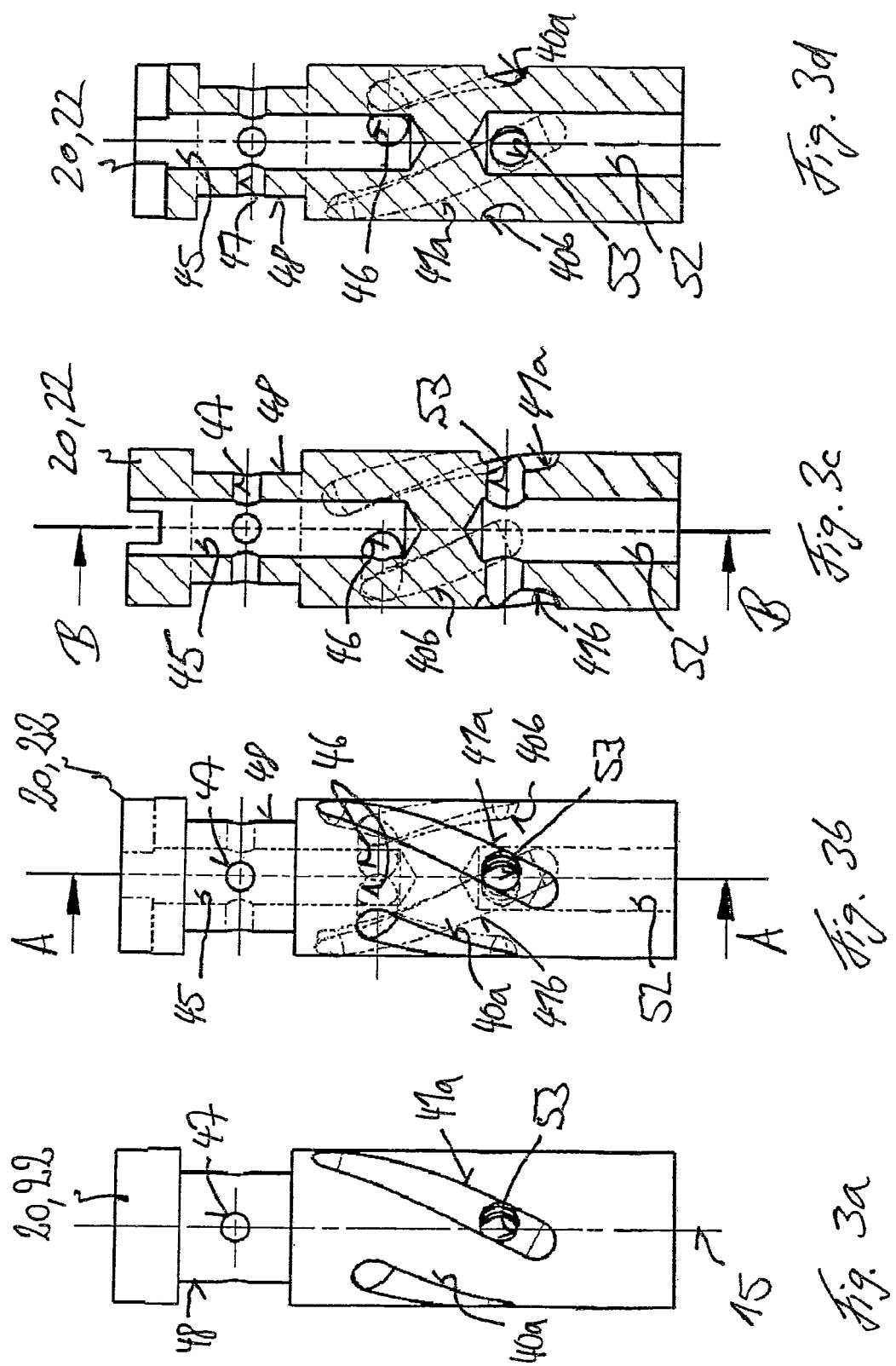

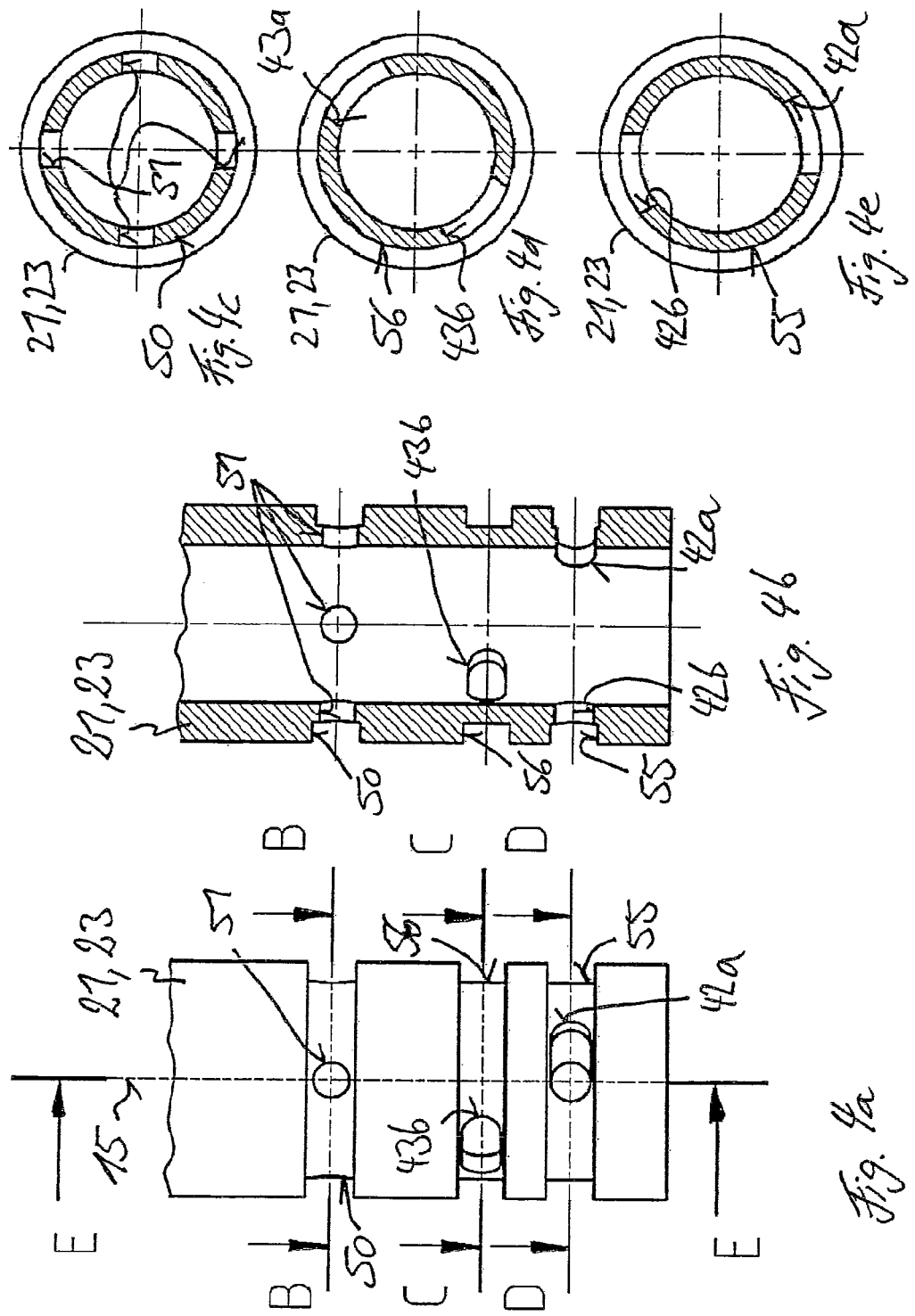

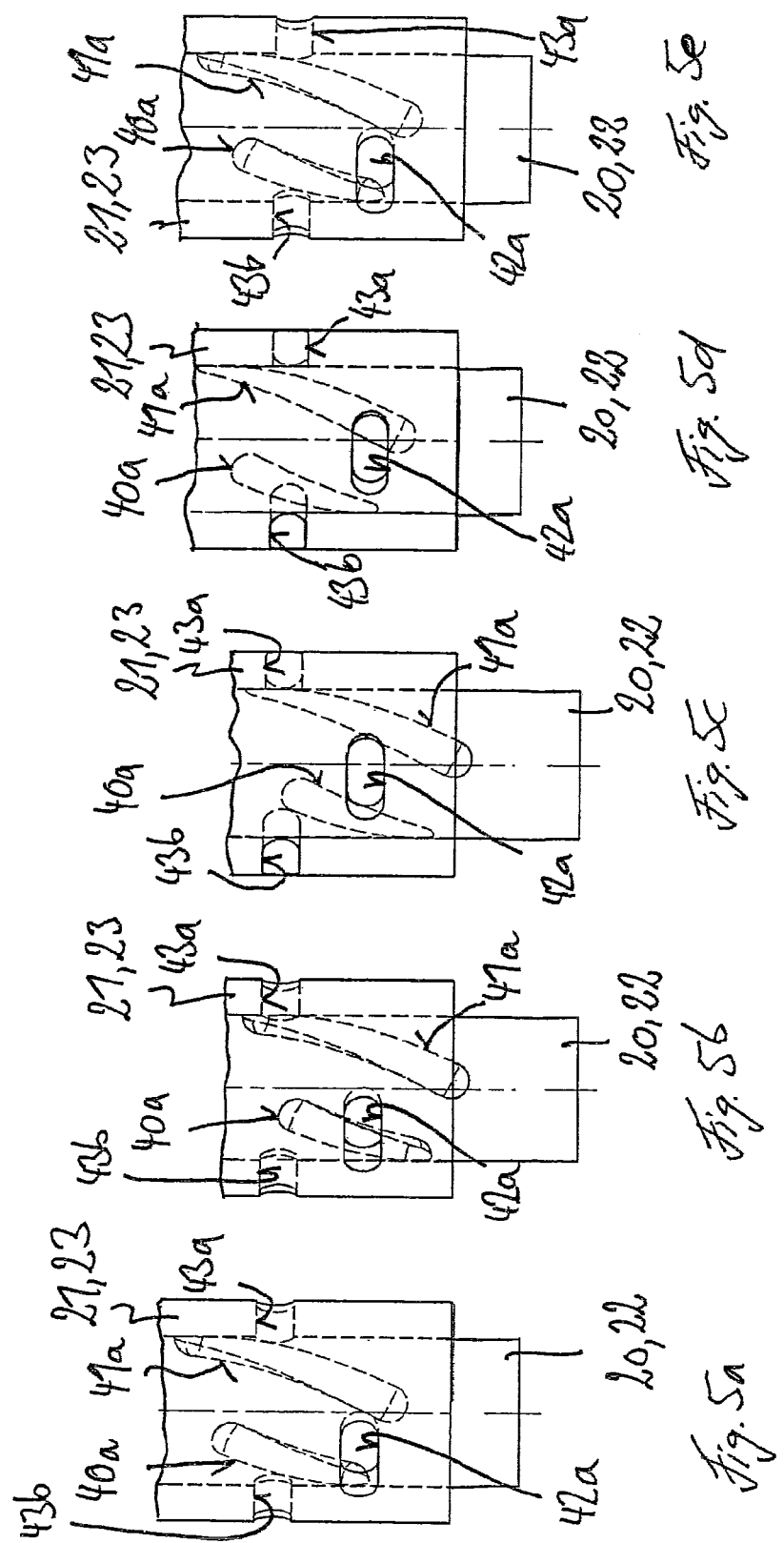

HYDROSTATIC POSITIVE DISPLACEMENT MACHINE

CROSS REFERENCE TO RELATED APPLICATION

This application claims priority to German Application DE 10 2012 106906.9 filed Jul. 30, 2012, which is herein incorporated by reference in its entirety.

BACKGROUND OF THE INVENTION

Field of the Invention

The invention relates to a hydrostatic positive displacement machine, in particular an axial piston machine with a variable displacement, which to vary the displacement has a pivoting cradle that can be pivoted by a hydraulic positioning device around a pivot axis. The positioning device for pivoting the cradle around the pivot axis has a positioning piston device and, to generate a control pressure that acts on the positioning piston device, has a position-controlled control valve which, to set a pivot angle control value of the pivoting cradle, has setting valve means which are actuated by a setpoint device and comprise feedback valve means which are mechanically coupled with the pivoting cradle for feedback of the current pivot angle value of the pivoting cradle.

Description of Related Art

Hydrostatic positive displacement machines with variable displacement are used as pumps or motors and can be operated in an open or a closed circuit. During the operation of these positive displacement machines, it has proven to be advantageous if the displacement can be varied by varying the inclination of a pivoting cradle on which there is a swash plate on which the displacement pistons of the displacement machine are supported. Hydraulic adjustment devices that can be mechanically, hydraulically, or electrically actuated and controlled are commonly used for this purpose.

To position the pivoting cradle, hydraulic positioning devices have a positioning piston device with at least one positioning piston which can be pressurized with a control pressure, and which is engaged with the pivoting cradle to position the cradle and which thus determines its inclination and therefore the displacement volume. A position-controlled control valve is provided to generate the control pressure exerted on the positioning piston device. The control valve is in communication with a control pressure source and a reservoir and controls the pressurization of the positioning piston compression chambers of the positioning piston device with the control pressure generated by the control pressure source or its decompression (depressurization) to the reservoir. To set a pivot angle control value for the pivoting cradle, the position-controlled control valve has setting valve means which are actuated by a setpoint device, and feedback valve means which are mechanically coupled with the pivoting cradle for feedback of the current pivot angle value of the pivoting cradle.

On positive displacement machines with a position-controlled control valve and a position feedback of the current pivoting angle value, electro-hydraulic positioning devices are known in which electrically actuated control pressure valves, such as proportional pressure reducing valves, are provided as the setpoint device. From an electrical actuation signal, the proportional pressure reducing values generate as a pivot angle control value of the pivoting cradle a hydraulic actuation pressure for a hydraulically actuated slave cylinder, which specifies a stroke to a hydraulically actuated slave cylinder. The slave cylinder is mechanically connected by a rotating lever with the control valve and the pivoting cradle. As a result of the stroke of the slave cylinder, on the control valve (in the form of a longitudinal slide valve), there is an axial movement of the control slide valve (in the form of a longitudinal slide valve member) which forms the setting valve means and connects the positioning piston compression chambers of the positioning piston device with the pivoting cradle by exposing cross sections with the control pressure source and the reservoir so that the pivoting cradle is pivoted around the pivoting axis. The pivot point of the rotary lever in a positioning device of this type is located outside the pivot axis of the pivoting cradle. When there is a pivoting movement of the pivoting cradle and a pivot angle control value specified by the movement of the slave cylinder, by means of the rotary lever (which is coupled with the pivoting cradle) there is thus an axial tracking of the longitudinally displaceable member of the control valve until the exposed control cross sections are reduced in size to the extent that the pivoting movement of the pivoting cradle ends and thus the pivoting cradle is in a positionally balanced control position.

A control valve in the form of a longitudinal slide valve with a control slide valve member which can be displaced longitudinally, is known from FIGS. 5 to 8 of DE 197 53 866 A1. The control valve can be actuated by a rotary lever and the feedback on the position of the pivoting cradle is provided by the rotary lever. Because of the requirement for a rotary lever, however, a position-controlled control valve in the form of a longitudinal slide valve member entails a high cost for components and thus a great deal of construction effort. If the rotary lever is actuated to set the pivot angle control value of a hydraulically pressurized slave cylinder, the number of components and thus the construction effort increases even further, not to mention the fact that the positioning device occupies a great deal of construction space.

To eliminate the expense and effort required for a rotary lever of this type, it is known from FIGS. 1 to 4 of DE 197 53 866 A1 that the feedback of the position of the pivoting cradle on a longitudinally displaceable sleeve of the control valve in the form of a control slide valve is preferable as the feedback valve means. The longitudinal slide valve member of the control slide valve, which forms the setting valve means, is located so that it can be displaced longitudinally inside of the sleeve of the control valve. A component that is connected with the pivoting cradle is engaged in a groove in the longitudinally displaceable sleeve to provide feedback on the position of the pivoting cradle. However, wear can occur between the groove in the sleeve and the component that is connected with the pivoting cradle, which has an adverse effect on the accuracy of the positioning.

DE 196 08 228 B4 describes a positioning device of a positive displacement machine with a variable displacement in which the position-controlled control valve is in the form of a rotary valve. A rotational control valve member of the rotary valve forms the setting valve means and can be actuated to set the pivot angle control value with an electrical stepper motor. The feedback of the position of the pivoting cradle, which is in the form of a swashplate, is provided by a rotating sleeve of the rotary valve in which the rotary slide valve member is located and which forms a feedback valve means. However, on account of the presence of the rotary control slide valve member of a position-controlled control valve of this type (in the form of a rotary slide valve), in which the pivot angle control value is set by a rotational actuation of the control slide valve, it is not possible to actuate the rotary slide valve by a hydraulic actuator pressure generated by electrically actuated control pressure valves instead of by the stepper motor.

An object of this invention is to provide a positive displacement machine of the general type described above but which has a simply constructed and compact position-controlled positioning device, and the control valve of which can be easily actuated by a hydraulic actuator pressure.

SUMMARY OF THE INVENTION

The invention accomplishes this object in that the setting valve means of the position-controlled control valve are axially displaceable and non-rotatable, and the feedback valve means of the position-controlled control valve are rotatable and locked to prevent axial displacement. As the result of an axial displacement of the setting valve means relative to the feedback valve means, control cross sections are exposed to pressurize a first positioning piston compression chamber of the positioning piston device with a control pressure and to decompress a second positioning piston compression chamber of the positioning piston device to a reservoir. The control cross sections are closed by a rotational movement of the feedback valve means relative to the setting valve means. The control valve of the invention therefore has non-rotatable and axially longitudinally displaceable setting valve means to specify the pivot angle control value. A setting valve means of this type can be easily actuated by a hydraulic actuator pressure. The current position of the pivoting cradle is fed back to the rotational feedback valve means, which are rotatable but are secured to prevent axial movement. Rotatable feedback valve means of this type can easily be coupled directly with the pivoting cradle. The position-controlled control valve of the invention therefore has only a small number of components and does not require a rotary lever or a complex mechanical coupling of the pivoting cradle and the feedback valve means, so that the positioning device of the invention is simple and economical to construct and can be very compact on account of the elimination of components.

On a position-controlled control valve of this type, the positioning piston compression chambers of the positioning piston device can be easily pressurized by a control pressure or decompressed to a reservoir if, as in one advantageous embodiment of the invention, helical control grooves are provided to form the control cross sections and are provided with control orifices that interact with the control grooves. With helical control grooves of this type and control orifices that interact with the control grooves and are located between the setting valve means and the feedback valve means, it becomes possible with little construction effort and expense, to expose control cross sections between the helical control grooves and the control orifices by the axial displacement of the setting valve means relative to the feedback valve means and to close the exposed control cross sections again by the rotational movement of the feedback valve means relative to the setting valve means.

It is particularly advantageous if, as in one development of the invention, the helical control grooves are inclined with respect to a longitudinal axis of the control valve. With an inclined orientation of the control grooves, it becomes easily possible during the axial displacement of the setting valve means relative to the feedback valve means to expose control cross sections on the control orifices and to close these cross sections again by the rotational movement of the feedback valve means relative to the setting valve means.

In one advantageous configuration of the invention, the helical control grooves have an identical pitch. It thereby becomes advantageously possible to open the control cross sections simultaneously and to close them simultaneously.

The construction effort and expense involved for the control orifices can be kept low if the control orifices are formed by radial borings or radial slots that are oriented in the peripheral direction.

In one advantageous development of the invention, the setting valve means are fastened non-rotationally to a control valve housing and a locking device is provided to prevent the rotation of the setting valve means. The axially longitudinally displaceable setting valve means can thereby be locked in position to prevent rotation with little construction effort or expense.

The locking device can be a locking pin with which the setting valve means are secured on a control valve housing to prevent rotation. With a locking pin or centering pin of this type, it is easily possible to prevent rotation of the longitudinally displaceable setting valve means by a non-rotational connection of the setting valve means with the control valve housing.

In a preferred embodiment of the invention, it is particularly advantageous to connect the feedback valve means with the pivoting cradle axially and non-rotationally. With a connection of this type between the pivoting cradle and the feedback valve means, it becomes easily possible to provide feedback on the position of the pivoting cradle and to axially secure the feedback valve means against displacement in the longitudinal direction of the control valve.

In one advantageous embodiment of the invention, the setting valve means comprise a longitudinally displaceable control slide valve and the feedback valve means are in the form of a rotatable sleeve. The control slide valve means are located inside the sleeve and can be displaced longitudinally inside it. A control valve, which is formed by a control slide valve member that comprises a rotatable and axially locked sleeve and a control slide valve that can move axially and longitudinally in the sleeve and is locked to prevent its rotation, requires a low level of manufacturing effort and expense.

In one alternative embodiment of the invention, the setting valve means are in the form of a longitudinally displaceable sleeve and the feedback means are in the form of a rotatable control slide valve. The control slide valve can rotate inside the longitudinally displaceable sleeve. A control valve formed from such an axially and longitudinally displaceable sleeve that is locked to prevent rotation and a control slide valve which is rotatable and axially secured in the sleeve can also be manufactured at little effort and expense.

In an embodiment of the invention, the helical control grooves are located on the setting valve means and the control orifices are located on the feedback valve means.

In an alternative embodiment of the invention, the helical control grooves are located on the feedback valve means and the control orifices are located on the setting valve means.

To achieve a pressurization of the corresponding positioning piston compression chamber of the positioning piston device with the control pressure and simultaneously to decompress a counteracting positioning piston compression chamber of the positioning piston device to the reservoir when the control valve is actuated, there is at least one first helical control groove which is connected with a control pressure source and at least one second helical control groove which is connected with a reservoir. At least one first control orifice is provided, which is in communication with the first positioning piston compression chamber of the positioning piston device. At least one second control orifice is provided, which is in communication with the second positioning piston compression chamber of the positioning piston device. In this embodiment of the invention, the helical control grooves are in communication with the control pressure source and the reservoir and the control orifices are in communication with the positioning piston compression chambers of the positioning piston device.

In an alternative embodiment of the invention, for the pressurization of the corresponding positioning piston compression chamber of the positioning piston device with the control pressure and the simultaneous decompression of a counteracting positioning piston compression chamber of the positioning piston device to the reservoir when the control valve is actuated, at least one first control orifice is in communication with a control pressure source and at least one second control orifice is in communication with the reservoir. At least a first helical control groove is provided which is in communication with the first positioning piston compression chamber of the positioning piston device. At least one second helical control groove is provided which is in communication with the second positioning piston control chamber of the positioning piston device. In this embodiment of the invention, the control orifices are in communication with the control pressure source and the reservoir, and the helical control grooves are in communication with the positioning piston compression chambers of the positioning piston device.

The first helical control groove and the second helical control groove can be of equal or different lengths.

The first helical control groove and the second helical control groove are advantageously offset from each other by an angle of 90°.

The exposure and closing of the control cross sections are achieved in a simple manner if the first control orifice and the second control orifice are offset from each other at an angle that is determined by the geometry of the helical control grooves, preferably at an angle of 90°.

In one advantageous development of the invention, the first helical control groove, the second helical control groove, the first control orifice, and the second control orifice, are each formed by a pair of control grooves or control orifices, respectively, which are opposite each other at an angle of 180°. Balanced pressure fields are thereby established between the control slide valve and the sleeve. As a result of which, friction between the control slide valve and the sleeve is eliminated and an accurate setting of the position of the pivoting cradle becomes possible.

It is particularly advantageous if the control slide valve is provided with connecting borings, by means of which the helical control grooves and/or the control orifices of the control slide valve are in communication with the control pressure source and the reservoir or with the positioning piston compression chambers. With internal connecting borings in the control slide valve of this type, preferably in the form of longitudinal borings, the helical control grooves formed in the control slide valve or the control orifices formed in the control slide valve can be easily placed in communication with little construction effort with a corresponding connection to the control valve housing. This makes possible communication with the control pressure source and the reservoir or the positioning piston compression chambers.

To connect a connecting boring of the control slide valve with a corresponding connection on the control valve housing, in one advantageous development of the invention an annular groove is provided on the control slide valve on the exterior cylindrical surface, by means of which the connecting boring is connected to a connection on the control valve housing.

The connection of this annular groove on the control slide valve with the corresponding connection of the control valve housing can be made easily if the sleeve is provided with an annular groove and a connecting opening that extends to the inner cylindrical surface of the sleeve.

The annular groove on the longitudinally displaceable control slide valve or on the longitudinally displaceable sleeve is appropriately sized so that the helical control grooves or the control orifices are connected with the control pressure source and with the reservoir over the total axial stroke range of the pilot valve means. This measure easily ensures a connection with the control pressure source and with the reservoir over the total axial stroke range.

If the connecting boring empties into a control compression chamber formed between the longitudinal slide valve and the control valve housing and is connected with a connection of the control valve housing, a connection of the helical control grooves and/or of the control orifices of the control slide valve with the control pressure source and with the reservoir and/or the positioning piston compression chambers can also be achieved with little manufacturing effort and expense.

In one advantageous embodiment of the invention, the sleeve is provided with annular grooves which are at some distance from one another in the longitudinal direction, by means of which the control orifices or helical control grooves of the sleeve can be placed in connection with the positioning piston compression chambers and/or with the control pressure source and the reservoir. With annular grooves of this type in the sleeve, the control grooves in the sleeve and/or the control orifices in the sleeve can be connected with little manufacturing effort or expense with a corresponding connection on the control valve housing, to achieve a connection with the control pressure source and with the reservoir and/or with the positioning piston compression chambers.

In one advantageous configuration of the invention, the helical control grooves are advantageously located on the exterior cylindrical surface of the control slide valve and the control orifices are advantageously located on the interior cylindrical surface of the sleeve. The helical control grooves can easily be machined into the exterior cylindrical surface of the control slide valve with little extra manufacturing effort and expense. The control orifices of radial borings or radial slots oriented in the peripheral direction can easily be machined on the interior cylindrical surface of the sleeve with little extra manufacturing effort and expense.

The control valve is preferably oriented with its longitudinal axis concentric to or axially parallel to the pivoting axis of the pivoting cradle. This makes possible a simple mechanical coupling of the rotatable feedback valve means with the pivoting cradle. With a concentric arrangement of the control valve, the feedback valve means can be connected directly with the pivoting cradle to provide feedback on the actual pivoting angle value. If the control valve longitudinal axis is offset axially parallel to the pivoting axis of the pivoting cradle, feedback on the actual pivoting angle value can be provided by a system of levers or a transmission device, such as gearing.

The feedback valve means can be mechanically connected with the pivoting cradle by a connecting web which extends through a slot-like recess of the control valve housing. This makes it possible, with particularly little manufacturing effort and expense, to achieve a non-rotational and axially fixed connection of the feedback valve means of the control valve with the pivoting cradle. On one hand, this makes it possible to provide feedback on the position of the pivoting cradle and, on the other hand, to secure the feedback valve means to prevent axial displacement.

In one preferred configuration of the invention, there is at least one actuator compression chamber on the setting valve means that can be pressurized by a hydraulic actuator pressure generated by a setpoint device, which is in the form of a control pressure valve. It thereby becomes possible to easily actuate the longitudinally displaceable setting valve means of the control valve by a hydraulic actuator pressure.

It is particularly advantageous if the control pressure valve can be actuated electrically so that with the position-controlled control valve it becomes possible to achieve a simply constructed and compact electro-hydraulic positioning device for the positive displacement machine.

In one advantageous configuration of the invention, the position-controlled control valve is installed in a pivot bearing of the pivoting cradle. The control valve of the invention can be installed, for example, in a journal of the pivoting cradle with which the pivoting cradle is mounted, so that it can pivot around the pivot axis in a housing of the positive displacement machine. This arrangement achieves a compact integration of the control valve of the invention into the pivot bearing of the pivoting cradle in the housing of the positive displacement machine, thereby achieving a compact construction of the positioning device of the control valve of the invention.

BRIEF DESCRIPTION OF THE DRAWINGS

Additional advantages and details of the invention are explained in greater detail below with reference to the exemplary embodiment illustrated in the accompanying schematic figures, in which:

FIG. 1 is a schematic illustration of a hydrostatic positive displacement machine with a positioning device of the invention;

FIG. 2 is a longitudinal section through the position-controlled control valve of the invention along line A-A in FIG. 1;

FIG. 3a shows the control slide valve of the control valve of the invention;

FIG. 3b shows the control slide valve from FIG. 3a with lines that are not visible in the view in FIG. 3a;

FIG. 3c is a section along the line A-A in FIG. 3b;

FIG. 3d is a section along line B-B in FIG. 3c;

FIG. 4a shows the sleeve of the control valve of the invention;

FIG. 4b is a longitudinal section along line E-E of the sleeve in FIG. 4a;

FIG. 4c is a section along line B-B in FIG. 4a;

FIG. 4d is a section along the line C-C in FIG. 4a;

FIG. 4e is a section along line D-D in FIG. 4a; and

FIGS. 5a to 5e show the position-controlled control valve in multiple valve positions.

DETAILED DESCRIPTION OF THE PREFERRED EMBODIMENTS

FIG. 1 shows a schematic longitudinal section of a positive displacement machine 1 in the form of an axial piston machine. The positive displacement machine 1 is in the form of a variable displacement machine with a variable displacement volume. To vary and set the positive displacement, the positive displacement machine 1 has a pivoting cradle 3 which pivots around a pivot axis 2. A swash plate 4 is formed on the pivoting cradle 3. Displacement pistons 5 of the positive displacement machine are supported on the swash plate 4. The displacement pistons 5 are arranged so that they move longitudinally in a cylinder drum, which is not illustrated in any further detail. In operation, the cylinder drum provided with the displacement pistons 5 rotates around an axis of rotation 6 which is oriented perpendicular to the pivoting axis 2 of the pivoting cradle 3 and forms a longitudinal axis of the positive displacement machine 1.

For pivoting of the pivoting cradle 3 around the pivot axis 2, a hydraulic positioning device 7 is provided which comprises a positioning piston device 8. In the illustrated exemplary embodiment, the positioning piston device 8 has two positioning pistons 8a, 8b, each of which is connected with the pivoting cradle 3. There is a first positioning piston compression chamber 9a is located on the positioning piston 8a and a second positioning piston compression chamber 9b is located on the positioning piston 8b. The positioning piston compression chambers 9a, 9b are pressurized by a control pressure or are decompressed to a reservoir and act in opposition to each other. Instead of two positioning pistons, each with a positioning piston compression chamber, a single positioning piston can be provided, on which the two positioning piston compression chambers that act in opposition are located, or which deflect the pivoting cradle against the force of a compression spring.

To pivot the pivoting cradle 3 in a first pivoting direction, the first positioning piston compression chamber 9a is pressurized with the control pressure and the second positioning piston compression chamber 9b is decompressed to a reservoir. Likewise, a pressurization of the second positioning piston compression chamber 9b with a control pressure and a decompression of the first positioning piston compression chamber 9a to the reservoir results in a pivoting movement of the pivoting cradle 3 in a second, opposite direction of pivoting.

A position-controlled control valve 10 in the form of a pilot valve is provided to control the pressurization of the positioning piston compression chambers 9a, 9b with the control pressure and to decompress the positioning piston compression chambers 9a, 9b to the reservoir.

The control valve 10 has a control pressure connection P which is in communication with a control pressure source 11, such as a control pressure pump, for example. The control valve 10 also has a first control pressure connection 12a in communication by a first control pressure line 13a with the first positioning piston compression chamber 9a of the positioning piston device 8a. A second control pressure connection 12b of the control valve 10 is in communication by a second control pressure line 13b with the second positioning piston compression chamber 9b of the positioning piston device 8b. A reservoir connection T connected to a reservoir 14 is also present on the control valve 10.

The control valve 10, as illustrated in greater detail in FIG. 2, is concentric to a longitudinal axis 15 and is aligned with the pivoting axis 2 of the pivoting cradle 3. The position-controlled control valve 10 has a setting valve means 20, which may also be referred to as a setting valve arrangement, actuated by a setpoint device 16, the actuation of which specifies a pivot angle control value of the pivoting cradle 3, and feedback valve means 21, which may also be referred to as a feedback valve arrangement, which are mechanically connected with the pivoting cradle 3 to provide feedback on the actual pivoting angle and thus on the current position of the pivoting cradle 3. In one aspect, the setting valve means 20 may be positioned within the feedback valve means 21.

On the control valve 10, the setting valve means 20 are located axially, thus longitudinally displaceable in the longitudinal direction of the longitudinal axis 15, and are secured to prevent rotation around the longitudinal axis 15. The feedback valve means 21 of the control valve 10 can rotate around the longitudinal axis 15 and are secured to prevent axial displacement in the longitudinal direction of the longitudinal axis 15.

In the illustrated exemplary embodiment, the control valve 10 has a control slide valve 22 in the form of a longitudinally slidable valve member which is located so that it can be displaced longitudinally in a rotating sleeve 23. The longitudinally displaceable and non-rotatable control slide valve 22 forms the setting valve means 20 and the rotatable and axially fixed sleeve 23 forms the feedback valve means 21. The sleeve 23 is concentric with the control slide valve 22 and is located in a housing boring of a control valve housing 24.

The setting valve means 20 that are longitudinally displaceable in the direction of the longitudinal axis 15 are non-rotatably connected with the control valve housing 24 by a locking device 25 to prevent rotation. In the illustrated exemplary embodiment, the locking device 25 of the setting valve means 20 is formed by a locking pin 26, such as a centering pin, which is fastened to one end of the control slide valve 22 in an eccentric position in relation to the longitudinal axis 15 and is inserted into a locating boring 27 of the control valve housing 24.

The rotatable feedback valve means 21 are axially and non-rotationally connected with the pivoting cradle 3 to provide feedback on the position of the pivoting cradle 3 to the control valve 10 and to secure the feedback valve means 21 axially in the longitudinal direction of the longitudinal axis 15. For this purpose, in the illustrated exemplary embodiment, there is a connecting web 28 connected with the sleeve 23 and the pivoting cradle 3. The web 28 extends through a slot-like recess 29 in the peripheral direction of the control valve housing 24.

In the illustrated exemplary embodiment, the setting valve means 20 can be actuated and controlled by a hydraulic actuator pressure. For this purpose, between the control valve housing 24 and the control slide valve 22, there is an actuator compression chamber 30 that can be pressurized by the hydraulic actuator pressure. To generate the hydraulic actuator pressure in the actuator compression chamber 30, there is a control pressure valve 31 that forms the setpoint device 16 and in the illustrated exemplary embodiment can be actuated electrically. The control pressure valve 31 is in communication on the input side with the control pressure source 11 and, for example, can be an electrically actuatable pressure reducing valve, such as a proportional pressure reducing valve which generates a hydraulic actuator pressure for the actuation of the setting valve means 20 proportional to the electrical control signal. The setting valve means 20 are provided with a spring 32 which counteracts the actuator pressure in the actuator compression chamber 30. The spring 32 is located in a control compression chamber 33, formed between the control valve housing 24 and the control slide valve 22, which is opposite the actuator compression chamber 30. The control compression chamber 33 is decompressed to the reservoir 14, for which purpose the reservoir connection T of the control valve 10 is located on the control valve housing 24 in the vicinity of the control compression chamber 33.

On the control valve 10, by means of an axial displacement of the setting valve means 20 (i.e., as a result of the actuator pressure in the actuator compression chamber 30 and thus the actual pivot angle indicated by the actuator signal of the setpoint device 16) relative to the feedback valve means 20 which are secured axially to prevent displacement in the longitudinal direction, control cross sections are exposed to pressurize the control positioning piston compression chamber 9a or 9b of the positioning piston device 8 with the control pressure of the control pressure source 11 and to decompress the counteracting positioning piston compression chamber 9b or 9a of the positioning piston device 8 to the reservoir 14, so that the pivoting cradle 3 is pivoted around the pivot axis 2. By a rotational movement of the rotatable feedback valve means 21 (which are non-rotatably connected with the pivoting cradle 3) relative to the setting valve means 20 (which are secured to prevent rotation around the longitudinal axis 15), the exposed control cross sections are once again closed so that the pivoting movement of the pivoting cradle 3 ends and the pivoting cradle 3 is in the balanced control position.

As shown in FIG. 2, to form these control cross sections, helical control grooves 40, 41 and control orifices 42, 43 that interact with the control grooves 40, 41 are located on the control valve 10 between the control slide valve 22 and the sleeve 23. The helical control grooves 40, 41 are inclined with respect to the longitudinal axis 15 of the control valve 10 and have the same pitch. The pitch of the helical control grooves 40, 41 can be any desired value. The control orifices 42, 43 are formed by radial slots oriented in the peripheral direction. Instead of slots, the control orifices 42, 43 can be formed by simple radial borings.

In the illustrated exemplary embodiment, the helical control grooves 40, 41 are located on the setting valve means 20 and are on the exterior cylindrical surface of the control slide valve 22 in the form of a longitudinal slide valve member and are machined into the cylindrical exterior surface of the control slide valve 22. The control orifices 42, 43 are located on the feedback valve means 21 and are located on the cylindrical interior surface of the sleeve 23.

In the illustrated exemplary embodiment, the helical control grooves 40 and 41 (as shown in greater detail in connection with FIGS. 3a to 3d) are each formed by a pair of helical control grooves 40a, 40b and 41a, 41b, respectively, each pair of which is located at an angle of 180° opposite the other on the control slide valve member 22. The control grooves 40a, 40b are offset from the control grooves 41a, 41b at an angle of 90°.

In the illustrated exemplary embodiment the helical control grooves 40a, 40b are connected with the control pressure source 11 and the helical control grooves 41a, 41b are connected with the reservoir 14.

In the control slide valve 22, an internal connecting boring 45 in the form of a slot connects the two control grooves 40a, 40b with the control pressure source 11. The internal connecting boring 45 is connected by the transverse boring 46 to the two opposite control grooves 40a, 40b. One or more additional transverse borings 47 connect the connecting boring 45 with an annular groove 48 located on the exterior cylindrical surface of the control slide valve 22. The annular groove 48 of the control slide valve 22, e.g., in the form of a peripheral groove, is in communication with the control pressure connection P of the control valve 10 via an annular groove 50 located on the exterior cylindrical surface of the sleeve 23 and at least one connecting opening 51 that extends to the interior cylindrical surface of the sleeve 23 in the vicinity of the annular groove 50. For this purpose, the annular groove 50 of the sleeve 23 is in communication via a boring (not shown in any further detail) in the control valve housing 24 with the control pressure connection P of the control valve 10. The length of the annular groove 48 on the control slide valve 22 in the axial direction of the longitudinal axis 15 is selected so that the control grooves 40a, 40b are in communication with the annular groove 50 of the sleeve 23 and thus with the control pressure connection P over the entire axial stroke range of the longitudinally adjustable control slide valve 22 and thus independently of the axial position of the control slide valve 22.

In the control slide valve 22, to connect the two control grooves 41a, 41b with the reservoir 14, there is an internal connecting boring 52 in the form of a slot which is connected by the transverse boring 53 to the two facing control grooves 41a, 41b. The connecting boring 52 leads to the control compression chamber 33, in which the spring 32 is located and which is decompressed to the reservoir 14 via the reservoir connection T of the control valve 10.

In the illustrated exemplary embodiment, the four helical control grooves 40a, 40b, 41a, 41b on the control slide valve 22 have different lengths viewed in the longitudinal direction of the control grooves. The two helical control grooves 40a, 40b are shorter than the two helical control grooves 41a, 41b that are decompressed to the reservoir 14.

As shown in greater detail in FIGS. 4a to 4d, in the illustrated exemplary embodiment the control orifices 42, 43 on the sleeve 23 are each formed by a pair of control orifices 42a, 42b and 43a, 43b, respectively, which are located opposite each other on the sleeve 23 at an angle of 180°. The control orifices 42a 42b are offset from the control orifices 43a, 43b by an angle determined by the geometry of the helical control grooves 40a, 40b, 41a, 41b.

In the illustrated exemplary embodiment, the control orifices 42a, 42b of the sleeve 23 are in communication with the positioning piston compression chamber 9a and the control orifices 43a, 43b are in communication with the positioning piston compression chamber 9b.

To connect the control orifices 42a, 42b of the sleeve 23 with the positioning piston compression chamber 9a, an annular groove 55 in the form of a peripheral groove is located on the exterior cylindrical surface of the sleeve 23. The control orifices 42a, 42b that are bored through to the interior cylindrical surface of the sleeve 23 are located in this groove and are in communication by means of a boring (not illustrated in any further detail) in the control valve housing 24 with the control pressure connection 12a of the control valve 10. Analogously, for connection of the control orifices 43a, 43b of the sleeve 23 with the positioning piston compression chamber 9b, an annular groove 56 in the form of a peripheral groove is located on the exterior cylindrical surface of the sleeve 23. The groove 56 includes control orifices 43a, 43b that extend through to the interior cylindrical surface of the sleeve 23 and is in communication by a boring (not illustrated in any further detail) in the control valve housing 24 with the control pressure connection 12b of the control valve 10.

Corresponding to the relative position of the control slide valve 22 to the sleeve 23, in the control valve 10 the control orifices 42a, 42b, 43a, 43b make possible an overlap and thus a connecting opening to the helical control grooves 40a, 40b, 41a, 41b, so that corresponding cross sections are created for the pressurization of the control piston compression chambers 9a and 9b, respectively, with the control pressure of the control pressure source 11 or for the decompression of the positioning piston compression chambers 9b and 9a, respectively, to the reservoir 14.

The three annular grooves 50, 55, 56 located on the exterior cylindrical surface of the sleeve are at some distance from one another along the longitudinal axis 15 in the longitudinal direction of the sleeve 23 and are therefore located on different planes.

The function of the position-controlled control valve 10 is described in greater detail on the basis of FIGS. 5a to 5e, wherein FIGS. 5a to 5e show only the control slide valve 22 and the sleeve 23 of the control valve 10.

FIG. 5a shows the control valve 10 in the non-actuated position. The control orifices 42a, 42b and 43a, 43b, respectively, are not overlapping and therefore there is no connection with the helical control grooves 40a, 40b and 41a, 41b, so that the positive displacement machine 1 is in a null position, for example in a position with a displacement of zero, in which the swashplate 4 of the pivoting cradle 3 is perpendicular to the axis of rotation 6 of the rotating cylinder drum.

To pivot the pivoting cradle 3 into a desired pivot angle position, the control pressure valve 16 is actuated by an electrical actuator signal so that a hydraulic actuator pressure is generated in the actuator compression chamber 30 which moves the longitudinally displaceable control slide valve 22 against the force of the spring 32 into a position which is the resultant of the equilibrium of forces of the actuator pressure applied in the actuator compression chamber 30 and the counteracting spring force of the spring 32. As a result of the axial movement of the non-rotatable control slide valve 22 with respect to the still stationary sleeve 23 (which is secured in the axial direction), control cross sections of the helical control grooves 40a, 40b of the control slide valve 22 pressurized by the control pressure are exposed to the control orifices 42a, 42b in the sleeve 23 and control cross sections of the control orifices 43a, 43b of the sleeve 23 are exposed to the helical control grooves 41a, 41b of the sleeve connected with the reservoir. Thus, the positioning piston compression chamber 9a is pressurized with the control pressure from the control pressure source 11 and the positioning piston chamber 9b is decompressed to the reservoir 14, so that the pivoting cradle 3 pivots into the position illustrated in FIG. 1. The axial adjustment of the control slide valve 22 with respect to the still stationary sleeve 23 is therefore transformed into a rotational movement of the pivoting cradle 3 around the pivot axis 2. In FIG. 5b, which corresponds to FIG. 2, this position of the control valve 10 is shown with a control slide valve 22 displaced relative to the sleeve 23 and thus with a currently pivoted pivoting cradle 3.

As a result of the pivoting movement of the pivoting cradle 3, by means of the non-rotational connection of the sleeve 23 (which is secured to prevent displacement in the axial direction with the pivoting cradle 3 by means of the connecting web 28), the sleeve 23 (which is secured to prevent displacement in the axial direction) is rotated around the longitudinal axis 15 relative to the control valve slide 22 (which is secured to prevent its rotation), so that by the rotational movement of the sleeve 23 which is coupled with the pivoting cradle 3, the overlaps and thus the exposed control cross sections between the control orifices 42a, 42b, 43a, 43b and the helical control grooves 40a, 40b, 41a, 41b are progressively reduced in size until the control cross sections are closed again upon reaching the specified pivot angle and the pivoting cradle 3 is in the equilibrium control position. This end position of the control valve 10 in which the pivoting cradle 3 is in the equilibrium control position and in which, on the control valve 10, the control cross sections of the control orifices 42a, 42b, and 43a, 43b, respectively, are once again closed with the helical control grooves 40*a*, 40*b* and 41*a*, 41*b*, respectively, is illustrated in FIG. 5*c*.

If, starting from this end position, the pivoting cradle 3 is to be pivoted back into the null position, the actuator pressure in the actuator compression chamber 30 of the control slide valve 22 is reduced so that the control slide valve 22 is retracted relative to the axially stationary sleeve 23 (as illustrated in FIG. 5*d*). As a result, control cross sections of the control orifices 42*a*, 42*b* are exposed with the helical control grooves 41*a*, 41*b* decompressed to the reservoir 14 and control cross sections of the control orifices 43*a*, 43*b* are exposed with the helical control grooves 40*a*, 40*b* pressurized with the control pressure. As a result, the positioning piston compression chamber 9*a* is depressurized to the reservoir 14 and the positioning piston compression chamber 9*b* is pressurized with the control pressure, so that the pivoting cradle 3 begins to pivot back into the null position.

By means of the connecting web 28, the sleeve 23 (which is secured to prevent displacement in the axial direction and is non-rotatably connected with the pivoting cradle 3) is rotated around the longitudinal axis 15 relative to the control slide valve 22, which is secured to prevent rotation. As a result of the pivoting movement of the sleeve 23 coupled with the pivoting cradle, the overlaps and thus the exposed control cross sections between the control orifices 42*a*, 42*b*, 43*a*, 43*b* and the helical control grooves 40*a*, 40*b*, 41*a*, 41*b* are progressively reduced in size until, when the control cross sections reach the null position (as illustrated in FIG. 5*e*), they are closed once again and the pivoting cradle 3 is in the null position.

The position-controlled control valve 10, on account of the low number of compact components, results in a simply constructed and compact electro-hydraulic positioning device 7 of a positive displacement machine 1 with feedback on the position of the pivoting cradle 3, which is advantageous in terms of the manufacturing costs and space required for the positioning device 7.

The invention is not limited to the illustrated exemplary embodiment.

Instead of the control slide valve 22 in the form of an axially displaceable and non-rotatable setting valve means 20 and the sleeve 23 as a rotatable and axially-secured feedback valve means 21, in an alternative embodiment the sleeve 23 can be in the form of an axially displaceable setting valve means 20 which is secured to prevent rotation, and the control slide valve 22 can be in the form of rotatable and axially secured feedback valve means 21. For this purpose, it must be possible to move the sleeve 23 longitudinally with the actuator pressure, and the control slide valve 22 must be connected non-rotationally and in an axially fixed manner with the pivoting cradle 3.

In addition, instead of the connection of the helical control grooves 40*a*, 40*b*, 41*a*, 41*b* with the control pressure source 11 and the reservoir 14, and the connection of the control orifices 42*a*, 42*b*, 43*a*, 43*b* with the positioning piston compression chambers 9*a*, 9*b*, in an alternative embodiment of the invention the control orifices 42*a*, 42*b*, 43*a*, 43*b* are in communication with the control pressure source 11 and the reservoir 14, and the helical control grooves 40*a*, 40*b*, 41*a*, 41*b* are in communication with the positioning piston compression chambers 9*a*, 9*b*.

In addition, as an alternative to the location of the helical control grooves 40*a*, 40*b*, 41*a*, 41*b* in the control slide valve 22 and the control orifices 42*a*, 42*b*, 43*a*, 43*b* in the sleeve 23, in an alternative embodiment of the invention it is possible to locate the helical control grooves 40*a*, 40*b*, 41*a*, 41*b* in the sleeve 23 and the control orifices 42*a*, 42*b*, 43*a*, 43*b* in the control slide valve 22.

As illustrated in FIGS. 5*a*, 5*c* and 5*e*, in the illustrated exemplary embodiment there is no overlap between the control orifices 42, 42*a*, 42*b*, 43, 43*a*, 43*b* and the control grooves 40, 40*a*, 40*b*, 41, 41*a*, 43*b*. It goes without saying that alternatively, the overlap between the control orifices 42, 42*a*, 42*b*, 43, 43*a*, 43*b* and the control grooves 40, 40*a*, 40*b*, 41, 41*a*, 43*b* can be alternatively positive or negative.

In an alternative to the illustrated exemplary embodiment, the setting valve means 20 can be pressurized at both control compression chambers 30, 33 by means of a preferably electrically actuated pilot valve with a corresponding actuator pressure, and can thus be actuated bilaterally with a hydraulic actuator pressure. Analogous to the control pressure connection P illustrated in FIG. 2, the tank connection T of the control valve 10 can for this purpose be in the form of corresponding annular grooves.

With the control valve 10, the pivoting cradle 3 can be pivoted to one side out of the null position in a unilaterally pivoting variable displacement machine. In addition, with the control valve 10, the pivoting cradle 3 can be pivoted in both directions from the null position in a bilaterally pivoting variable displacement machine.

The positive displacement machine can be in the form of a pump or a motor.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A hydrostatic positive displacement machine having a variable displacement volume, comprising:
    a cradle pivotable by a hydraulic positioning device around a pivot axis, wherein the positioning device comprises a positioning piston device to pivot the cradle around the pivot axis;
    a position-controlled control valve configured to generate a control pressure to pressurize the positioning piston device wherein the position-controlled control valve comprises a setting valve arrangement actuated by a setpoint device and a feedback valve arrangement mechanically coupled with the cradle to provide feedback on an actual pivot angle value of the cradle,
    wherein the setting valve arrangement is axially displaceable and non-rotatable,
    wherein the feedback valve arrangement is rotatable and axially non-displaceable,
    wherein the setting valve arrangement is positioned within the feedback valve arrangement,
    wherein control cross sections are exposed for pressurization of a first positioning piston compression chamber of the positioning piston device with a control pressure and for decompression of a second positioning piston compression chamber of the positioning piston device to a reservoir by axial displacement of the setting valve arrangement relative to the feedback valve arrangement,
    wherein the control cross sections are closed by rotational movement of the feedback valve arrangement relative to the setting valve arrangement, and wherein, on the setting valve arrangement, there is at least one actuator compression chamber which is pressurized by a hydraulic actuator pressure generated by a setpoint device in the form of a control pressure valve to move the setting valve arrangement to initiate operation of the position-controlled control valve.

2. The hydrostatic positive displacement machine as recited in claim 1, wherein the control cross sections comprise helical control grooves and control orifices that interact with the helical control grooves.

3. The hydrostatic positive displacement machine as recited in claim 2, wherein the helical control grooves are inclined with respect to a longitudinal axis of the position-controlled control valve.

4. The hydrostatic positive displacement machine as recited in claim 3, wherein the helical control grooves have an identical pitch.

5. The hydrostatic positive displacement machine as recited in claim 2, wherein the control orifices are formed by radial borings or radially oriented slots.

6. The hydrostatic positive displacement machine as recited in claim 1, wherein the setting valve arrangement is non-rotatably fastened to a control valve housing and a locking device prevents rotation of the setting valve arrangement.

7. The hydrostatic positive displacement machine as claimed in claim 6, wherein the locking device comprises a locking pin, with which the setting valve arrangement is non-rotatably secured to the control valve housing.

8. The hydrostatic positive displacement machine as recited in claim 1, wherein the setting valve arrangement comprises a longitudinally displaceable control slide valve and the feedback valve arrangement comprises a rotatable sleeve, wherein the control slide valve is longitudinally displaceable in the sleeve.

9. The hydrostatic positive displacement machine as recited in claim 2, wherein the helical control grooves are on the setting valve arrangement and the control orifices are on the feedback valve arrangement.

10. The hydrostatic positive displacement machine as recited in claim 2, wherein the helical control grooves are on the feedback valve arrangement and the control orifices are on the setting valve arrangement.

11. The hydrostatic positive displacement machine as recited in claim 2, comprising a configuration selected from:
  (a) at least one first helical control groove connected with a control pressure source, at least one second helical control groove connected with a reservoir, at least one first control orifice in communication with the first positioning piston compression chamber of the positioning piston device, and at least one second control orifice in communication with the second positioning compression chamber of the positioning piston device; or
  (b) at least one first control orifice connected with a control pressure source, at least one second control orifice connected with a reservoir, at least one first helical control groove in communication with the first positioning piston compression chamber of the positioning piston device, and at least one second helical control groove in communication with the second positioning piston compression chamber of the positioning piston device.

12. The hydrostatic positive displacement machine as recited in claim 11, wherein the first helical control groove and the second helical control groove are of equal or different length.

13. The hydrostatic positive displacement machine as recited in claim 11, wherein the first helical control groove and the second helical control groove are offset from each other by an angle of 90°.

14. The hydrostatic positive displacement machine as recited in claim 11, wherein the first control orifice and the second control orifice are offset from each other at an angle of 90°.

15. The hydrostatic positive displacement machine as recited in claim 11, wherein the first helical control groove, the second helical control groove, the first control orifice, and the second control orifice are each formed by a pair of control grooves and a pair of control orifices which are opposite each other at an angle of 180°.

16. The hydrostatic positive displacement machine as recited in claim 8, wherein the control slide valve includes connecting borings, by means of which the helical control grooves or the control orifices of the control slide valve are connected with the control pressure source and the reservoir or with the positioning piston compression chambers.

17. The hydrostatic positive displacement machine as recited in claim 16, including an annular groove on an exterior cylindrical surface of the control slide valve, by means of which a connecting boring is connected to a connection of the control valve housing.

18. The hydrostatic positive displacement machine as recited in claim 17, wherein the sleeve includes an annular groove and a connecting opening that extends to an interior cylindrical surface of the sleeve for connection of the annular groove of the control slide valve with the connection of the control valve housing.

19. The hydrostatic positive displacement machine as recited in claim 17, wherein the annular groove is sized so that the helical control grooves or the control orifices are connected with the control pressure source or with the reservoir over an entire axial stroke range of the setting valve arrangement.

20. The hydrostatic positive displacement machine as recited in claim 16, wherein the connecting boring empties into a control pressure chamber located between the control slide valve and the control valve housing, which control pressure chamber is connected with a connection of the control valve housing.

21. The hydrostatic positive displacement machine as recited in claim 8, wherein the sleeve includes annular grooves that are separated from each other in a longitudinal direction, by means of which the control orifices or helical control grooves of the sleeve are connected with at least one of the positioning piston compression chambers, the control pressure source, and the reservoir.

22. The hydrostatic positive displacement machine as recited in claim 8, wherein the helical control grooves are on an exterior cylindrical surface of the control slide valve and the control orifices are on an interior cylindrical surface of the sleeve.

23. The hydrostatic positive displacement machine as recited in claim 1, wherein the control valve is oriented with a longitudinal axis concentric to or axially parallel offset from the pivot axis of the cradle.

24. The hydrostatic positive displacement machine as recited in claim 1, wherein the feedback valve arrangement is mechanically connected with the cradle by a connecting web which extends through a slot recess in the control valve housing.

25. The hydrostatic positive displacement machine as recited in claim 1, wherein the control pressure valve is electrically actuated.

26. The hydrostatic positive displacement machine as recited in claim 1, wherein the position-controlled control valve is located in a rotary bearing of the cradle.

* * * * *